(12) United States Patent
Takai (10) Patent No.: US 11,194,412 B2
(45) Date of Patent: Dec. 7, 2021

(54) OPERATION DETECTION DEVICE (71) Applicant: KABUSHIKI KAISHA TOKAI RIKA DENKI SEISAKUSHO, Aichi (JP)

(72) Inventor: Toshihito Takai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/623,957

(22) PCT Filed: Jun. 29, 2018

(86) PCT No.: PCT/JP2018/024909
§ 371 (c)(1),
(2) Date: Dec. 18, 2019

(87) PCT Pub. No.: WO2019/026504
PCT Pub. Date: Feb. 7, 2019

(65) Prior Publication Data
US 2020/0142512 A1    May 7, 2020

(30) Foreign Application Priority Data

Aug. 3, 2017    (JP) .............................. JP2017-150698

(51) Int. Cl.
*G06F 3/041*    (2006.01)

(52) U.S. Cl.
CPC .... *G06F 3/041* (2013.01); *G06F 2203/04104* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 5,263,375 A | * | 11/1993 | Okada | B25J 13/085 73/862.042 |
| 5,510,812 A | * | 4/1996 | O'Mara | G01L 1/20 345/156 |
| 6,016,097 A | * | 1/2000 | Gardner | G01B 7/002 338/2 |
| 2004/0169504 A1 | * | 9/2004 | Son | G01L 5/1623 324/207.17 |

(Continued)

FOREIGN PATENT DOCUMENTS

JP   2012-068836 A   4/2012
JP   WO-20120160844   * 11/2012

(Continued)

*Primary Examiner* — Patrick N Edouard
*Assistant Examiner* — Peijie Shen
(74) *Attorney, Agent, or Firm* — Roberts Calderon Safran & Cole P.C.

(57) ABSTRACT

An operation detection device includes an operation unit including an operation surface to be operated thereon, a load sensor disposed on a lower surface of the operation unit to detect a load applied to the operation surface, and a protective member that allows a load of not more than a predetermined first load to be applied to the load sensor and that prevents a load more than the predetermined first load from being applied to the load sensor by a contact with the lower surface of the operation unit so as to protect the load sensor.

9 Claims, 4 Drawing Sheets

(56) References Cited

U.S. PATENT DOCUMENTS

| | | | |
|---|---|---|---|
| 2004/0181312 A1* | 9/2004 | Miura | B25J 13/085 700/258 |
| 2006/0181517 A1* | 8/2006 | Zadesky | G06F 3/045 345/173 |
| 2010/0159183 A1* | 6/2010 | Nishimura | B29C 45/14639 428/77 |
| 2012/0098767 A1* | 4/2012 | Takai | G06F 3/04142 345/173 |
| 2012/0222498 A1* | 9/2012 | Mamigonians | G01L 1/142 73/862.626 |
| 2014/0102222 A1* | 4/2014 | Wade | G01L 1/18 73/862.382 |
| 2014/0202776 A1* | 7/2014 | Kane | G01G 19/12 177/136 |
| 2016/0210849 A1* | 7/2016 | Stussi | G08G 1/095 |
| 2016/0273977 A1* | 9/2016 | Wade | G01L 19/06 |
| 2016/0328067 A1* | 11/2016 | Aoki | G06F 3/0412 |
| 2017/0220144 A1* | 8/2017 | Campbell | G06F 3/04142 |
| 2017/0299448 A1* | 10/2017 | Campbell | G01L 1/044 |
| 2018/0081485 A1* | 3/2018 | Shu | G01L 1/142 |
| 2018/0334107 A1* | 11/2018 | Polak | B60K 37/06 |

FOREIGN PATENT DOCUMENTS

| | | | |
|---|---|---|---|
| JP | 2013-016336 A | | 1/2013 |
| JP | 2013016336 A | * | 1/2013 |
| WO | 2012160844 A1 | | 11/2012 |

\* cited by examiner

OPERATION DETECTION DEVICE

CROSS-REFERENCE TO RELATED APPLICATIONS

The present application is a U.S. National Phase of PCT/JP2018/024909 filed on Jun. 29, 2018 claiming priority to Japanese Patent Application No. 2017-150698 filed on Aug. 3, 2017. The disclosure of the PCT Application is hereby incorporated by reference into the present Application.

TECHNICAL FIELD

The present invention relates to an operation detection device.

BACKGROUND ART

A touch panel display is known which is provided with a touch pad arranged on a base, four load sensors arranged between the touch pad and the base at the four corners of the touch pad, and a microcomputer which detects a touched position based on output voltage of the load sensors (see, e.g., Patent Literature 1).

CITATION LIST

Patent Literature

Patent Literature 1: JP 2012/68836 A

SUMMARY OF INVENTION

Technical Problem

In case of the touch panel display described in Patent Literature 1, the load sensors may fail when too much load (or an excessive load) is applied to the touch pad.

It is an object of the invention to provide an operation detection device that can protect e load sensor from the excessive load.

Solution to Problem

According to an embodiment of the invention, an operation detection device comprises: an operation unit comprising an operation surface to be operated thereon; a load sensor disposed on a lower surface of the operation unit to detect a load applied to the operation surface; and a protective member that allows a load of not more than a predetermined first load to be applied to the load sensor and that prevents a load more than the predetermined first load from being applied to the load sensor by a contact with the lower surface of the operation unit so as to protect the load sensor.

Advantageous Effects of Invention

According to an embodiment of the invention, it is possible to provide an operation detection device that can protect the load sensor from the excessive load.

DESCRIPTION OF EMBODIMENTS

Summary of the Embodiment

An operation detection device in an embodiment has an operation unit comprising an operation surface for receiving operations, load sensors disposed on a lower surface of the operation unit to detect a load applied to the operation surface, and a protective member that allows a load of not more than a predetermined first load to be applied to the load sensors while preventing a load greater than the predetermined first load from being applied to the load sensors by coming into contact with the lower surface of the operation unit and thereby protects the load sensors.

In the operation detection device, when a load of not less than the predetermined first load is applied to the operation unit, the protective member protects the load sensors by restricting movement of the operation unit in a direction in which the load is applied. Therefore, unlike when such a configuration is not adopted, it is possible to protect the load sensors from excessive loads.

Embodiment (General Configuration of Touch Pad 1)

Figure 1:
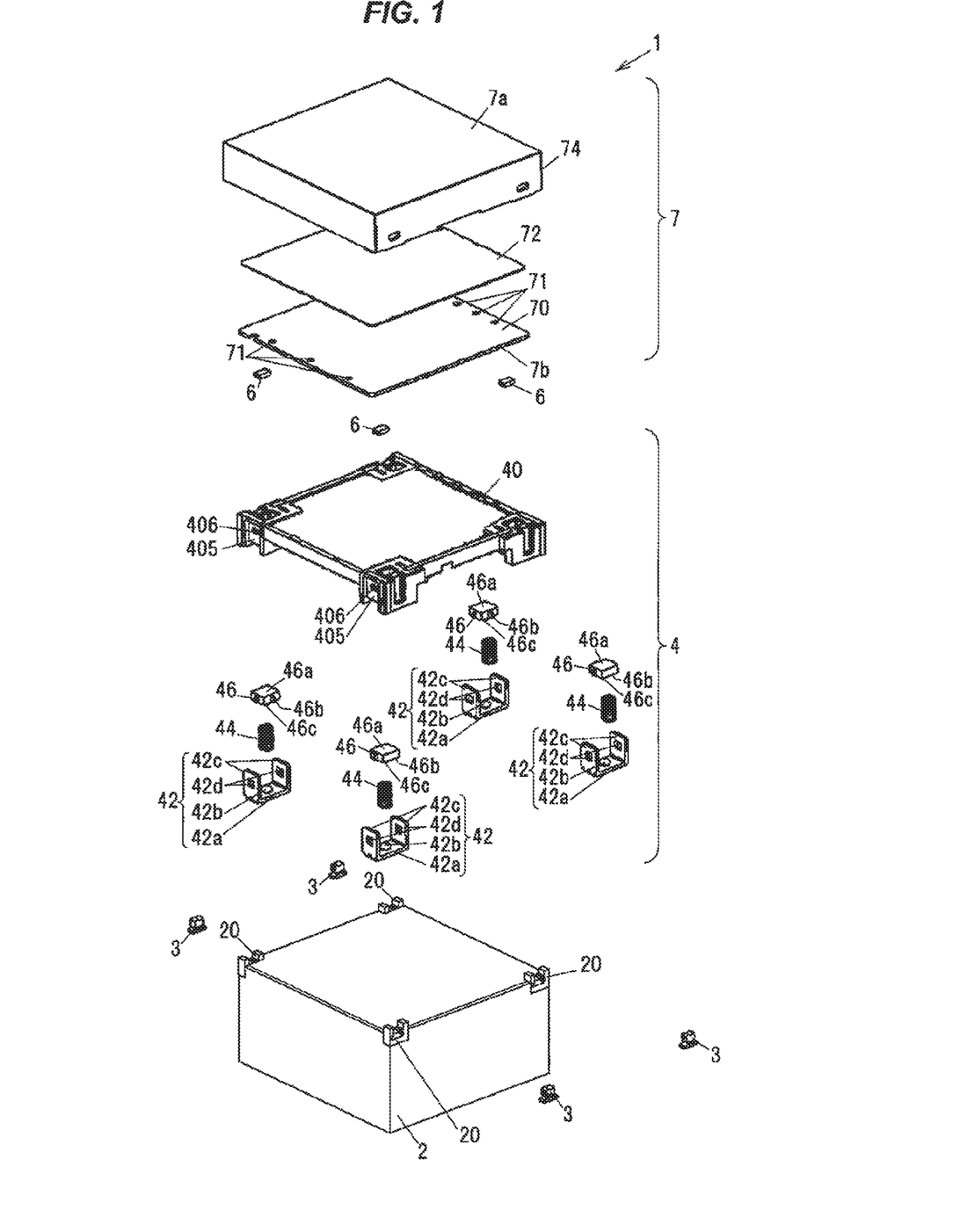
FIG. 1 is an exploded perspective view showing an example of a touch pad in an embodiment.
Figure 2A:
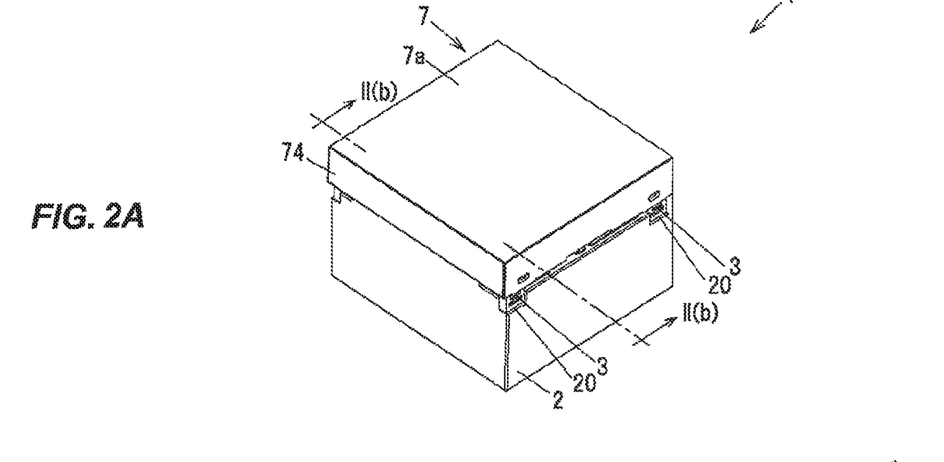
FIG. 2A is a perspective view showing the touch pad in the embodiment.
Figure 2B:
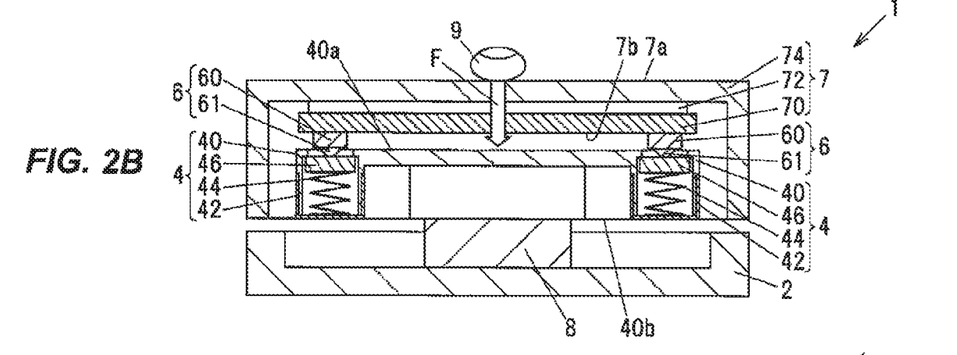
FIG. 2B is a schematic cross-sectional view when a cross section taken along a line II(b)-II(b) in FIG. 2A is viewed in the direction of the arrow.
Figure 2C:
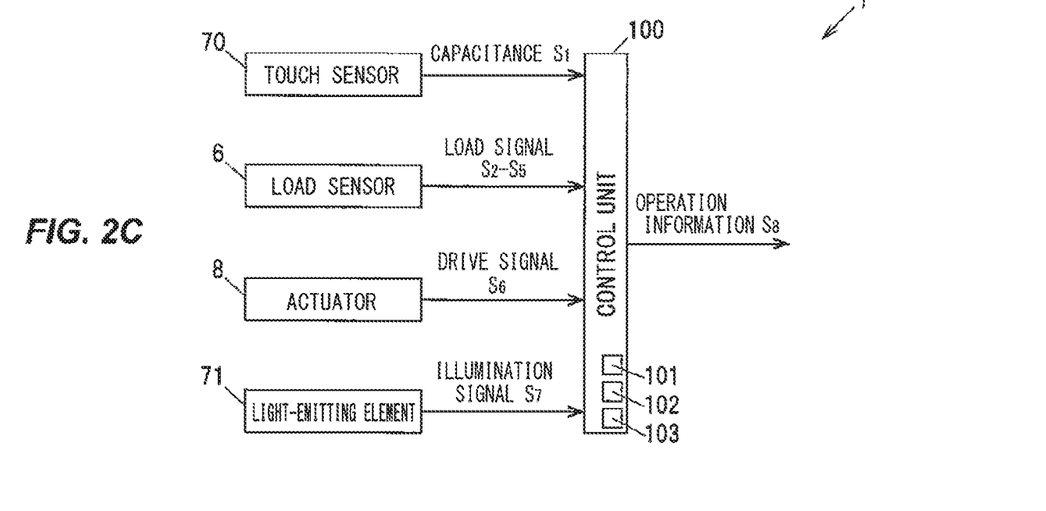
FIG. 2C is a block diagram illustrating the touch pad.
Figure 3A:
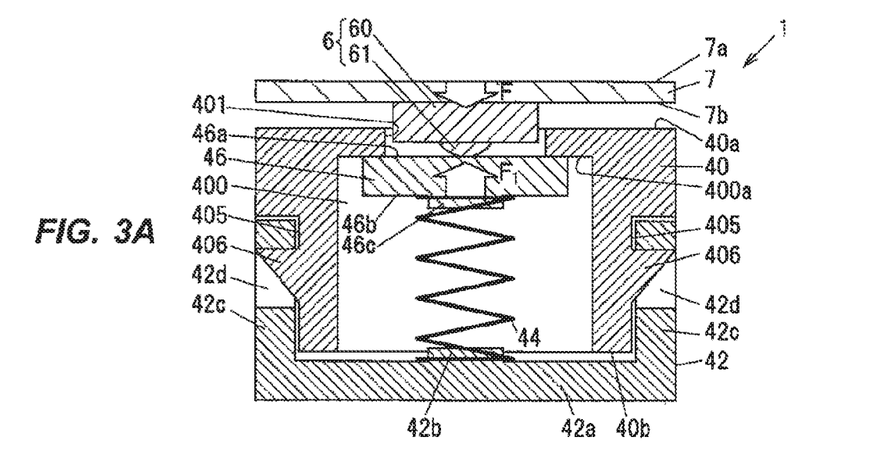
FIG. 3A is an explanatory cross-sectional view showing how a limiter mechanism unit of the touch pad in the embodiment works when an applied load is not more than a second load which is lower than a predetermined first load.
Figure 3B:
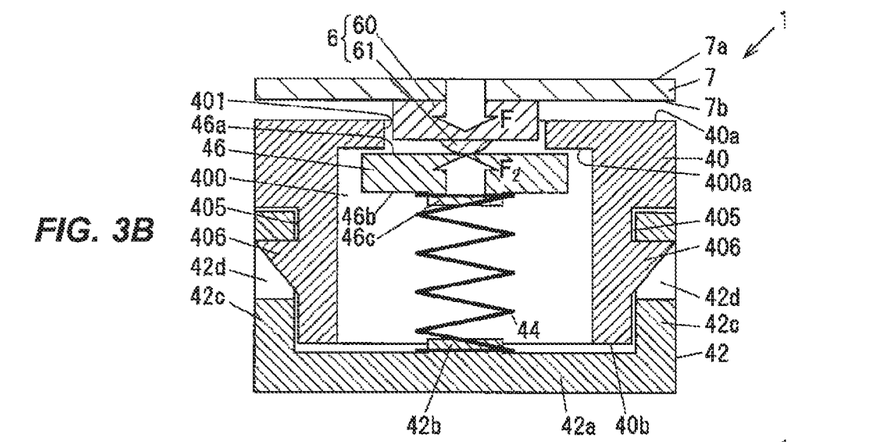
FIG. 3B is an explanatory cross-sectional view showing how the limiter mechanism unit of the touch pad in the embodiment works when an applied load is not less than the second load, which is lower than the predetermined first load, and not more than the predetermined first load.
Figure 3C:
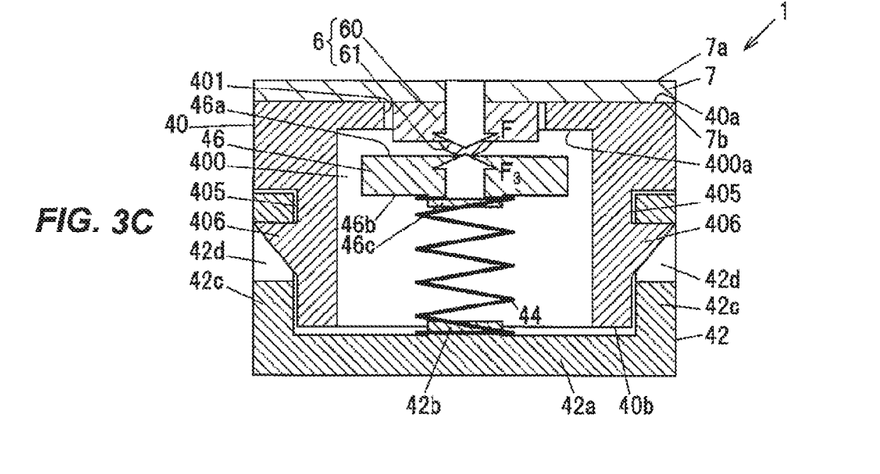
FIG. 3C is an explanatory cross-sectional view showing how the limiter mechanism unit of the touch pad in the embodiment works when an applied load is not less than the predetermined first load.

FIG. 1 is an exploded perspective view showing a touch pad in the embodiment. FIG. 2A is a perspective view showing the touch pad in the embodiment, FIG. 2B is a schematic cross-sectional view when a cross section taken along line II(b)-II(b) of FIG. 2A is viewed in the direction of the arrow, and FIG. 2C is an example block diagram illustrating the touch pad. FIGS. 3A to 3C are explanatory cross-sectional views showing how a limiter mechanism unit of the touch pad in the embodiment works.

In each drawing for the present embodiment, a scale ratio may be different from the actual ratio. The arrow shown in FIG. 2B indicates a load F which is caused by an operation performed on an operation surface $7a$ by an operating finger 9 and acts downward. In FIG. 2C, flows of main signals and information are indicated by arrows. Up arrows shown in FIGS. 3A to 3C indicate an elastic force of a spring 44. Down arrows indicate a load acting in a direction pressing down the operation surface 7a (a load application direction). Furthermore, the numerical range described as "A-B" means "not less than A and not more than B".

A touch pad 1 is the operation detection device is arranged on a floor console between a driver's seat and a passenger's seat in a vehicle, as an example. The touch pad 1 is arranged such that, e.g., the left side on the paper plane of FIG. 1 is the rear side of the vehicle and the right side is the front side, as an example. The touch pad 1 is configured to operate, e.g., an electronic device mounted on the vehicle, as an example. The touch pad 1 is configured to detect, e.g., swipe operation, tap operation, pinch operation and push operation, etc., performed on the operation surface 7a.

The touch pad 1 has, e.g., an operation unit 7 having an operation surface 7a to be operated, load sensors 6 arranged on a lower surface 7b of the operation unit 7 to detect a load applied to the operation surface 7a, and a limiter mechanism unit 4 as the protective member which allows a load of not more than a predetermined first load to be applied to the load sensors 6 while preventing a load greater than the predetermined first load from being applied to the load sensors 6 by coming into contact with the lower surface 7b of the operation unit 7 and thereby protects the load sensors 6, as shown in FIGS. 1 to 2C.

The touch pad 1 is also provided with, e.g., an actuator 8 and a control unit 100 which controls a touch sensor 70, light-emitting elements 71, the load sensors 6 and the actuator 8, as shown in FIGS. 2B and 2C.

As an example, in the touch pad 1, the load sensors 6 are respectively arranged under the four corners of the operation surface 7a, as shown in FIG. 1. The number of the load sensors 6 is not limited thereto.

The limiter mechanism unit 4 and the operation unit 7 are attached to, e.g., a case 2, as shown in FIGS. 1 and 2A. The case 2 is formed of a resin material such as PBT (polybutylene terephthalate), as an example. For example, tour cushioning members 3 formed of a resin material are arranged between the case 2 and a base 40 (described later), as shown in FIGS. 1 and 2A, The cushioning members 3 are attached to fitting portions 20 of the case 2.

(Configuration of the Limiter Mechanism Unit 4)

The limiter mechanism unit 4 has, e.g., plates 46 in contact with the load sensors 6, springs 44 as elastic bodies for applying an elastic force to the plates 46 in a direction toward the operation unit 7, the base 40 having housing portions 400 for housing the plates 46 and the springs 44 and also having openings 401 which are respectively connected to the housing portions 400 and into which the load sensors 6 partially enter, and caps 42 attached to the base 40 so as to cover end portions of the housing portions 400 on the opposite side to the openings 401, as shown in FIGS. 3A to 3C.

The cap 42, the spring 44 and the plate 46 form a set and four sets, which correspond to the number of the load sensors 6, are attached to the base 40. Therefore, four housing portions 400 and four openings 401 are provided on the base 40 so as to correspond to the installation positions of the load sensors 6. Each housing portion 400 has, e.g., a shape which allows for movement of the rectangular box-shaped plate 46.

As an example, the base 40 is formed of a resin material such as ABS (acrylonitrile butadiene styrene). The operation unit 7 is arranged on an upper surface 40a side of the base 40.

The base 40 also has recesses 405 which are, e.g., formed to sandwich the housing portions 400, as shown in FIGS. 3A to 3C. A claw 406 is formed in each recess 405.

As an example, the actuator 8 is arranged, e.g., between the case 2 and the base 40 so as to be in contact with a lower surface 40b, as shown in FIG. 2B.

The cap 42 is formed of, e.g., a resin material such as PC (polycarbonate). The cap 42 has, e.g., a shape formed by bending an elongated plate at a right angle so that both ends face each other. Thus, the cap 42 has, e.g., a bottom portion 42a and side portions 42c which are located at both ends of the bottom portion 42a and face each other, as shown in FIG. 1.

A support portion 42b having a raised shape is provided on the bottom portion 42a. The support portion 42b is inserted into one end of the spring 44.

An opening 42d is provided on each side portion 42c. The opening 42d is configured that, e.g., the claw 406 of the recess 405 of the base 40 is fitted thereto, as shown in FIGS. 3A to 3C. In other words, the cap 42 is integrated with the base 40 by inserting the side portions 42c into the recesses 405 and fitting the claws 406 to the openings 42d.

The spring 44 is a coil spring formed using carbon steel (piano wire), as an example. However, the elastic body is not limited to the coil spring as long as it applies a required elastic force to the plate 46 and returns to the original shape.

As an example, the plate 46 is formed of a resin material such as POM (polyacetal) and has a plate shape. A surface 46a of the plate 46 is, e.g., in contact with the load sensor 6 and also in contact with an inner upper surface 400a of the housing portion 400, as shown in FIGS. 3A to 3C. In addition, a support portion 46c having a raised shape is provided on a back surface 46b. The support portion 46c is inserted into the other end of the spring 44. Thus, the spring 44 is supported by the cap 42 and the plate 46.

The spring 44 when housed in the base 40 is elastically deformed in a load range of not less than a second load (8N, as an example) lower than the predetermined first load (10N, as an example) and not more than the predetermined first load. That is, the springs 44 housed in the base 40 apply the same elastic force (8N, as an example) to the plates 46.

The limiter mechanism unit 4 is configured such that, with an applied load within such a load range, the springs 44 are elastically deformed via the plates 46 to allow movement of the load sensors 6 and thereby allow the load sensors 6 to detect a load from zero up to the predetermined first load, and with an applied load greater than the predetermined first load, the upper surface 40a of the base 40 restricts movement of the load sensors 6 by coming into contact with the lower surface 7b of the operation unit 7 and thereby prevents the load sensors 6 from detecting a load greater than the predetermined first load.

When the cap 42 is attached to the base 40, the spring 44 in the compressed state is housed in the housing portion 400. The compressed spring 44 applies, e.g., an elastic force F1 to the plate 46, as shown in FIG. 3A. As an example, the elastic force F1 is 8N when the predetermined first load is 10N.

When the load F is applied to the center of the operation surface 7a and the load sensors 6 are arranged at the four corners of the operation surface 7a, one quarter of the load F is ideally applied to each load sensor 6. The example shown in FIGS. 3A to 3C, in which the load F is applied directly above the load sensor 6 and acts on the load sensor 6 and on the limiter mechanism unit 4, will be described below.

When, e.g., the load F of not more than the elastic force F1 of the spring 44 is applied to the operation surface 7a, the plate 46 does not move as shown in FIG. 3A, as if it is fixed to the base 40. In this case, the load sensor 6 detects the load F.

When, e.g., the load F greater than the elastic force F1 of the spring 44 is applied to the operation surface 7a, the spring 44 receives the load F via the operation surface 7a, the load sensor 6 and the plate 46 and is compressed, as shown in FIG. 3B. In this case, the load sensor 6 detects the load F. An elastic force F2 of the spring 44 shown in FIG. 3B is larger than the elastic force F1 by, e.g., the compressed amount. Then, the operation surface 7a moves toward the case 2 to a position at which the load F is balanced with the elastic force F2.

When the load F is even larger, the operation surface 7a moves in a direction in which the load F is applied, and the lower surface 7b of the operation unit 7 comes into contact with the upper surface 40a of the base 40, as shown in FIG. 3C. Since movement of the plate 46 is restricted by this contact, the spring 44 has an elastic force F3 as the largest value. The load causing the elastic force F3, i.e., the load acting at the moment of contact between the lower surface 7b of the operation unit 7 and the upper surface 40a of the base 40 is defined as the first load.

The load sensor 6 shown in FIG. 3C detects the load causing the elastic force F3. In case that a load greater than such a load is applied to the operation surface 7a, the load sensor 6 detects only the load causing the elastic force F3 since the load other than the load causing the elastic force F3 of the spring 44 is received by the base 40. As an example, the largest value of the elastic force F3 of the spring 44 is 10N when the first load is 10N.

When the load F is, e.g., 600N, only 10N as the predetermined first load is applied to the load sensor 6 and the remaining load (590N) is received by the base 40. Therefore, it is possible to prevent an unexpected excessive load from being applied to the load sensor 6.

As an example, restriction by the limiter mechanism unit 4 in the present embodiment is such that a load from 0 up to 10N acts on one load sensor 6. In other words, the detection range of one load sensor 6 is from 0 to 10N, as an example.

(Configuration of the Load Sensor 6)

The load sensor 6 is, e.g., a piezoresistive or capacitive MEMS (Micro-Electro-Mechanical Systems). As an example, the load sensor 6 in the present embodiment is a capacitive sensor in which a bridge circuit is composed of four gauges.

The load sensor 6 has, e.g., a load button 61 which protrudes from a main body 60. The load sensor 6 is configured that a load applied to the load button 61 causes a change in the resistance values of the gauges located therein and the output of the bridge circuit changes accordingly.

The four load sensors 6 output, e.g., load signals $S_2$ to $S_5$ to the control unit 100, as shown in FIG. 2C. For example, the control unit 100 converts the load signals $S_2$ to $S_5$ into a load and determines whether or not a push operation is performed.

(Configuration of the Operation Unit 7)

As an example, the operation unit 7 has the touch sensor 70, a light guide 72 and a panel 74, as shown in FIG. 1.

The touch sensor 70 is, e.g., a capacitive touch sensor and is configured to detect multi-touch. In detail, the touch sensor 70 is configured that plural drive electrodes and plural detection electrodes intersecting into a grid while maintaining insulation therebetween are provided on a substrate.

As an example, the substrate is a printed circuit board on which plural light-emitting elements 71 are arranged at opposing edges, as shown in FIG. 1. The light-emitting elements 71 emit light based on, e.g., an illumination signal $S_7$ output from the control unit 100.

The touch sensor 70 reads capacitance of the plural drive electrodes and the plural detection electrodes in all combinations and outputs the capacitance for one cycle as capacitance $S_1$ to the control unit 100.

The light guide 72 is formed of, e.g., a highly transparent resin material such as acryl and has a sheet shape. The light guide 72 is attached to the panel 74 by, e.g., an adhesive.

The light guide 72 guides light of the light-emitting elements 71 in a direction toward the operation surface 7a so that the operation surface 7a is illuminated. Thus, the light guide 72 may contain diffusing particles, etc., which diffuse light of the light-emitting elements 71.

The panel 74 is formed of, e.g., a transparent resin such as PC. In addition, for example, a transparent region transparent to light and a light-blocking region blocking light are formed on the panel 74 by printing, etc., and symbols are thereby formed on the operation surface 7a.

The panel 74 has, e.g., a box shape which has a top portion serving as the operation surface 7a and is opened at the lower portion, as shown in FIG. 2A. In addition, the panel 74 is integrated with the light guide 72 and the touch sensor 70.

(Configuration of the Actuator 8)

The actuator 8 is provided for causing vibration of the operation surface 7a through the base 40. As an example, the actuator 8 is a unimorph piezoelectric actuator.

The actuator 8 causes vibration based on, e.g., a drive signal $S_6$ output from the control unit 100, as shown in FIG. 2C.

(Configuration of the Control Unit 100)

The control unit 100 is, e.g., a microcomputer composed of a CPU (Central Processing Unit) performing calculation and processing, etc., of the acquired data according to a stored program, a RAM (Random Access Memory) and a ROM (Read Only Memory) as semiconductor memories, etc. The ROM stores, e.g., a program for operation of the control unit 100, a capacitance threshold 101, a load threshold 102 and drive information 103. The RAM is used as, e.g., a storage area for temporarily storing calculation results, etc.

When, e.g., the operation unit 7 detects an operation and the load sensors 6 detect a load caused by the operation, the control unit 100 controls a controlled device by judging that the a push operation has been performed, and the control unit 100 also controls the actuator 8 to cause vibration of the operation surface 7a, thereby providing tactile feedback to indicate that the push operation has been received. Then, the control unit 100 generates operation information $S_8$ which includes the coordinate values of the operation-detected point and information about whether or not a push operation has been performed, and the control unit 100 outputs the operation information $S_8$ to the controlled device.

The controlled device is, e.g., a navigation device, a music and video player, or an air conditioner, etc.

In detail, the control unit 100 periodically acquires the capacitance $S_1$ from the touch sensor 70 and compares the capacitance $S_1$ to the capacitance threshold 101. When, e.g., a capacitance of not less than the capacitance threshold 101 is present, the control unit 100 calculates the operation-detected point on the operation surface 7a based on distribution of the capacitance. As an example, weighted average, etc., may be used for the calculation.

The control unit 100 also compares a load obtained based on the load signals $S_2$ to $S_5$ from the load sensors 6, to the load threshold 102. When a load of not less than the load threshold 102 is detected, the control unit 100 determines that a push operation has been performed.

The drive information 103 is, e.g., information about the drive pattern of the drive signal $S_6$. When a push operation is detected, the control unit 100 generates the drive signal $S_6$ which has a drive pattern indicating that the push operation has been received, and the control unit 100 outputs the drive signal $S_6$ to the actuator 8 to provide tactile feedback. As a modification, the tactile feedback may be, e.g., tactile feedback mimicking a sensation of pushing a mechanical push button, etc.

Also as a modification, to detect swipe operation or touch operation, the control unit 100 may be configured to determine an operation by detection of a capacitance of not less than the capacitance threshold 101 in combination with detection of a load of not less than the predetermined first load. Since the control unit 100 makes the determination based on such a combination, it is possible to prevent a false detection caused by an operating finger which is distant from the operation surface 7a, i.e., moving nearby in the air. In addition, since the control unit 100 makes the determination based on the combination described above, it is possible to prevent a false detection based on a load which is detected when the operating finger unintentionally touches due to vibration of a vehicle.

The operation of the touch pad 1 will be described below.

(Operation)

The control unit 100 of the touch pad 1 outputs the illumination signal $S_7$ to the light-emitting elements 71 and illuminates the operation surface 7a when, e.g., the power of the vehicle is turned on. Then, the control unit 100 acquires and monitors the capacitance $S_1$ and the load signals $S_2$ to $S_5$ while comparing with the capacitance threshold 101 and the load threshold 102.

When an operation is detected but a push operation is not detected, the control unit 100 generates the operation information $S_8$ including the coordinate values of the operation-detected point and the fact of no push operation performed, and outputs the operation information $S_8$ to the controlled device. Meanwhile, when a push operation is detected, the control unit 100 generates the operation information $S_8$ including the coordinate values of the operation-detected point and the fact of push operation performed, and outputs the operation information $S_8$ to the controlled device.

Effects of the Embodiment

In the touch pad 1 of the present embodiment, the load sensors 6 can be protected from excessive loads. In detail, the touch pad 1 is configured that when a large load (excessive load) which can break the load sensors 6 is applied to the operation surface 7a, the operation unit 7 moves in the load application direction and comes into contact with the base 40, and a load of not less than the predetermined first load is thereby prevented from being applied to the load sensors 6. Therefore, unlike when such configuration is not adopted, excessive load is not applied to the load sensors 6 in the touch pad 1 and the load sensors 6 thus can be protected from excessive loads.

In the touch pad 1, since the maximum load to be applied to the load sensors 6 can be easily adjusted by changing a spring constant of the springs 44, protection tailored to the load bearing performance of the load sensors 6 can be provided. In addition, since the maximum load can be easily adjusted, it is not necessary to change the design even when the load bearing performance of the load sensors 6 is changed, which allows the touch pad 1 to be compatible with various specifications. In addition, in the touch pad 1, since protection tailored to the load bearing performance of the load sensors 6 can be provided, the load sensors 6 can be protected even when an excessive load is applied directly above the load sensors 6.

As a modification, the touch pad 1 may have a configuration in which the touch sensor 70 is not provided. The touch pad 1 in this case can accurately detect the operated position based on an output of each load sensor 6 since the operation unit 7 is reliably in contact with the four load sensors 6.

Figure 4A:
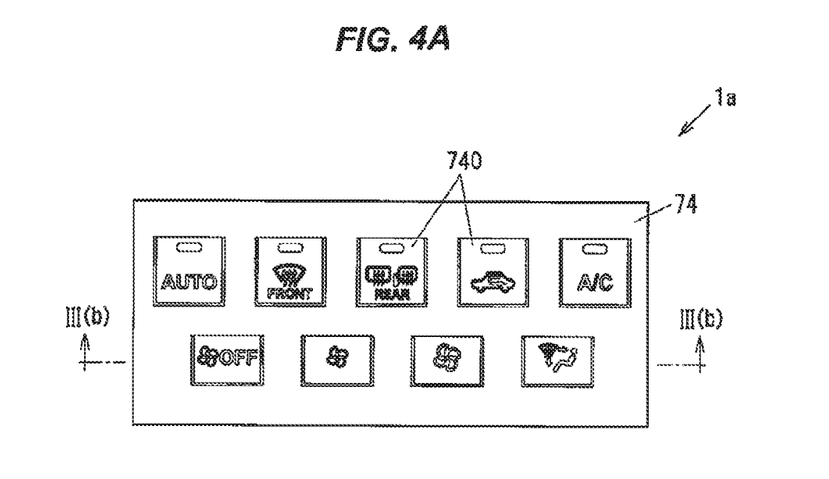
FIG. 4A is an explanatory diagram illustrating an operation detection device in another embodiment.
Figure 4B:
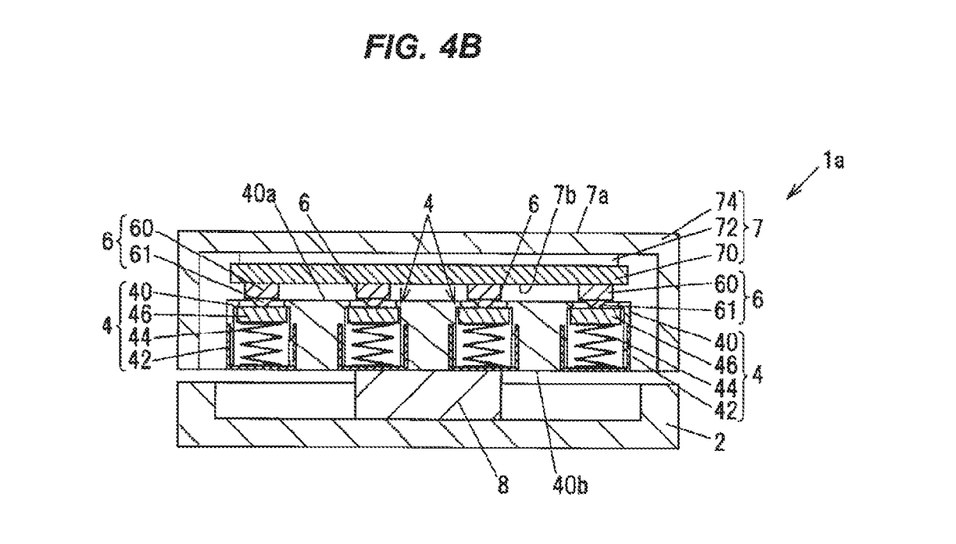
FIG. 4B is a cross sectional view when a cross section taken along a line III(b)-III(b) in FIG. 4A is viewed in the direction of the arrow.

FIG. 4A is an explanatory diagram illustrating an operation detection device in another embodiment and FIG. 4B is a cross sectional view when a cross section taken along the line III(b)-III(b) in FIG. 4A is viewed in the direction of the arrow. In the other embodiment described below, portions having the same function and configuration as those in the embodiment described above are denoted by the same reference numerals as the embodiment and the explanation thereof will be omitted.

An operation detection device 1a is configured as, e.g., an operation unit of an air conditioner, as shown in FIG. 4A. Plural operation buttons 740 are arranged on a surface of the panel 74 of the operation detection device 1a. In addition, the limiter mechanism unit 4 described above and the load sensor 6 are paired and arranged under each of the plural operation buttons 740, as shown in FIG. 4B.

The operation detection device 1a is configured to detect an operated operation button 740 by the capacitive touch sensor 70 and also detect a push operation on the operation button 740 by the load sensors 6. The operation detection device 1a outputs the operation information $S_8$ about the push-operated operation button. 740 to the air conditioner. Based on the operation information $S_8$, the air conditioner exerts a function assigned to the push-operated operation button 740.

In the operation detection device 1a, the load sensors 6 can be protected since excessive load is not applied to the load sensors 6 due to having the limiter mechanism units 4. As a modification, the operation detection device 1a may be configured such that the pairs of the limiter mechanism unit 4 and the load sensor 6 are arranged only under the four corners of the operation surface 7a.

Although some embodiments and modifications of the invention have been described above, the embodiments and modifications are merely an example and the invention according to claims is not to be limited thereto. These new embodiments and modifications may be implemented in various other forms, and various omissions, substitutions and changes, etc., can be made without departing from the gist of the invention. In addition, all combinations of the features described in these embodiments and modifications are not necessary to solve the problem of the invention. Further, these embodiments and modifications are included within the scope and gist of the invention and also within the invention described in the claims and the equivalency thereof.

REFERENCE SIGNS LIST

1 TOUCH PAD
1a OPERATION DETECTION DEVICE
2 CASE
4 LIMITER MECHANISM UNIT

6 LOAD SENSOR
7 OPERATION UNIT
7a OPERATION SURFACE
7b LOWER SURFACE
40 BASE
40a UPPER SURFACE
40b LOWER SURFACE
42 CAP
44 SPRING
46 PLATE
100 CONTROL UNIT
102 LOAD THRESHOLD
103 DRIVE INFORMATION
400 HOUSING PORTION
401 OPENING
740 OPERATION BUTTON

The invention claimed is:

1. An operation detection device, comprising:
an operation unit comprising an operation surface to be operated thereon;
a load sensor disposed with one side thereof contacted with a lower surface of the operation unit to detect a load applied to the operation surface; and
a protective member that allows a load of not more than a predetermined first load to be applied to the load sensor and that prevents a load more than the predetermined first load from being applied to the load sensor by a contact of an upper surface thereof with the lower surface of the operation unit so as to protect the load sensor,
wherein the protective member comprises a plate to allow a surface thereof to contact an other side of the load sensor, an elastic body to apply an elastic force to the plate in a direction toward the operation unit and to elastically deform by the load applied to the operation surface, a base comprising a housing portion to house the plate and the elastic body and to allow inner upper surface thereof to contact the surface of the plate by the elastic force of the elastic body, and an opening connected to the housing portion and allowing a portion of the load sensor to enter therethrough and penetrating through the upper surface and the inner upper surface, and
wherein the protective member comprises a separate cap that is attachable to the base so as to cover an end portion of the housing portion on the opposite side to the opening, wherein the cap is integrated with the base by inserting a side portion of the cap into a recess of the base sandwiching the housing portion, with the elastic body being installed on the cap.

2. The operation detection device according to claim 1, wherein the elastic body, when housed in the housing portion, is elastically deformed in a load range of not less than a second load lower than the predetermined first load and not more than the predetermined first load.

3. The operation detection device according to claim 2, wherein the protective member is configured such that, with an applied load within the load range, the elastic body is elastically deformed via the plate to allow movement of the load sensor so as to allow the load sensor to detect a load from zero up to the predetermined first load, and with an applied load more than the predetermined first load, the upper surface of the base restricts movement of the load sensor by a contact with the lower surface of the operation unit so as to prevent the load sensor from detecting a load more than the predetermined first load.

4. The operation detection device according to claim 2, wherein the protective member is configured such that when a load more than the predetermined first load is applied, the upper surface of the base contacts with the lower surface of the operation unit and the load other than the predetermined first load is thereby received by the base.

5. The operation detection device according to claim 1, wherein the load sensor comprises a main body internally comprising a bridge circuit formed of gauges and a load button protruding from the main body, and is configured that the resistance values of the gauges change according to a load applied to the load button and an output of the bridge circuit thereby changes.

6. The operation detection device according to claim 1, comprising:
a control unit that is configured to compare a load threshold to a load based on a load signal from the load sensor and, when a load more than the load threshold is detected, to output operation information to a controlled device by judging that a push operation has been performed on the operation unit.

7. The operation detection device according to claim 1, wherein the load sensor comprises a plurality of load sensors, and the protective member comprises a plurality of protective members corresponding the plurality of load sensors.

8. The operation detection device according to claim 7, wherein the plurality of load sensors are respectively provided under the four corners of the operation unit.

9. The operation detection device according to claim 7, wherein the operation unit is configured that a plurality of operation buttons are arranged on the operation surface, and the plurality of load sensors are respectively provided under the plurality of operation buttons.

* * * * *